March 15, 1927.

C. E. F. AHLM 1,620,854

TRANSMISSION GEARING

Filed Dec. 30, 1924

Charles E. F. Ahlm, Inventor

By Bates, Macklin, Goldrick & Teare, Attorneys

Patented Mar. 15, 1927.

1,620,854

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed December 30, 1924. Serial No. 758,940.

This invention relates to transmission gearing such as used, for example, in automobile transmissions to secure different speeds and reverse drive between the motor and rear axle or driven member.

The gearing comprises essentially a gearing connection between driving and driven members including an eccentrically mounted internal external gear member meshing internally with a spur gear which is connected with one of the members and externally with a gear connected with the other. It also includes means for connecting a driving or driven member to the eccentric bearing for a reduced speed and means is provided for connecting certain of the parts together, for direct drive, that is causing the driving and driven members to rotate at the same speed.

The general objects of the invention are to secure simplicity, cheapness of construction, and compactness consistent with strength whereby the weight of the parts are reduced to a minimum.

A further object includes, in the arrangement of such a gearing, the provision of means for locking certain of the members, particularly one member, for accomplishing the reverse motion between the driving and driven member. Carrying out this principle and in obtaining the above objects, the internal external gear may be arranged in different form or may even be two internal gears on one rigid member coacting with two spur gears and mounted to rotate upon an eccentric bearing, the spur gears in that case being rigid with the driving and driven member respectively. The drawings illustrate certain of these modifications and in each instance, means is provided for holding one member to secure a reverse drive, and other connections may be made to cause direct drive or the driving of the driven member at a materially lower speed than the driving member.

Further objects and advantages embodied in this invention will become apparent in the following description, having reference to the drawings and to the different modifications therein illustrated.

Figure 1:
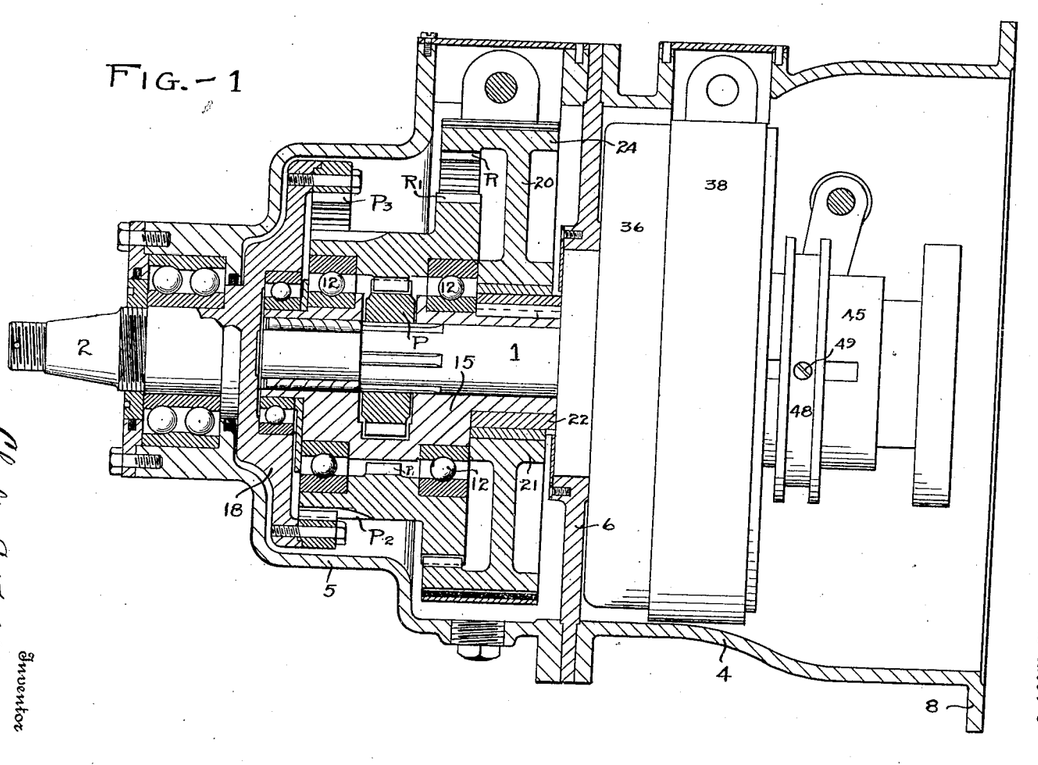
Fig. 1 is a substantially axial section through a preferred form of my gearing arrangement.

Designating the various parts by the use of reference characters and referring first to Fig. 1, a shaft adapted to be connected and disconnected from the engine and which may be termed the driving member is indicated at 1; 2 is the driven member adapted to be connected in the form shown with the propeller shaft leading to the rear axle. A suitable casing is shown as comprising parts 4 and 5 secured together by suitable flanges embracing the propeller of the spider or bearing support member 6, the right hand portion of the casing being shown as suitably flanged at 8 for convenient attachment to the parts, such as to the bell-housing or crank case.

Referring briefly to the essential elements as shown in this figure P is a pinion rigid on the driving shaft 1; $P^1$ is an internal gear formed on the composite gear member, having also an external gear; $P^2$ rigid therewith. This composite gear member has been referred to as the internal external gear and preferably is carried upon separate bearings, designated 12, having their support on the rotatable eccentric bearing member 15 embracing or surrounding the driving member. The gear $P^2$ is shown in that arrangement as meshing with an internal gear $P^3$ rigid with a suitable flanged member 18, which is in turn rigid with a propeller shaft. This gear P³ will be referred to as the propeller gear. The gear R¹ meshes with an internal gear R formed on a suitable wheel like body 20 having a hub 21 freely mounted on a sleeve 22 embracing the extension of the eccentric bearing. These parts are referred to hereinafter more in detail.

Figure 2:
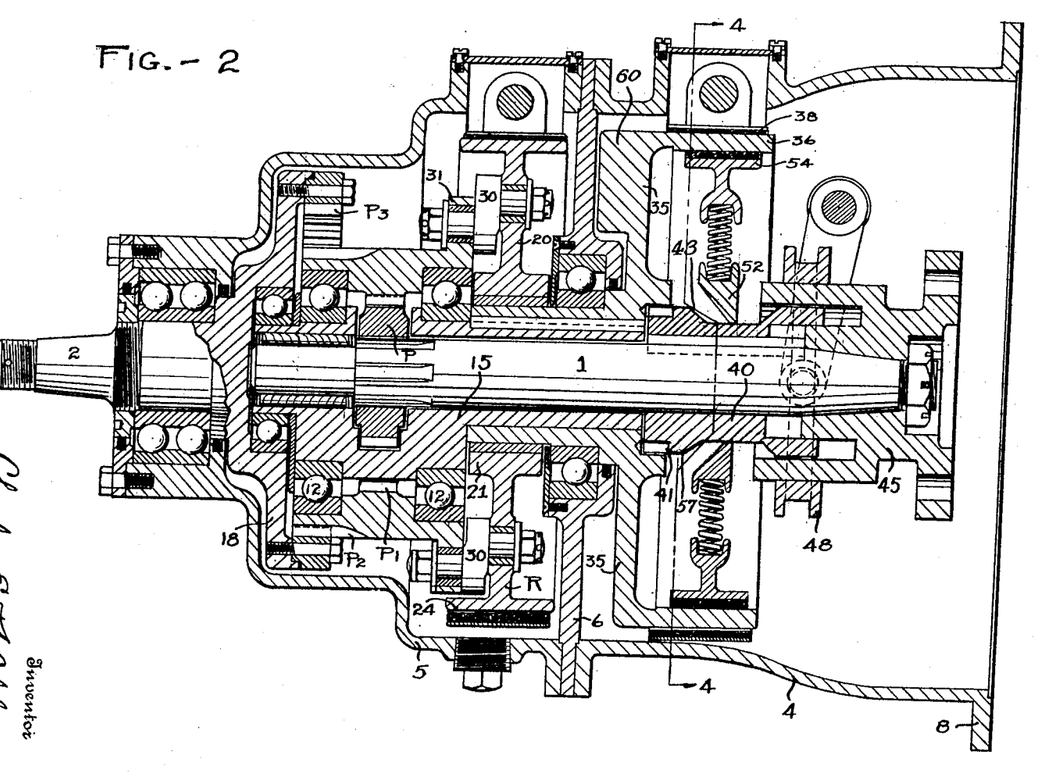
Fig. 2 is a similar section showing a slightly modified arrangement of connections between an eccentric bearing and a means for holding the same.

For convenience, the modification shown in Fig. 2 will next be briefly referred to and the comparative operation by the way of illustrating the utility of my invention will then be described. In this arrangement, as before, a similar arrangement is required. The driving member and the driven shaft is indicated as before, and the connection between the propeller or driven member and the driving shaft includes the spur gear or pinion P meshing with internal gear P¹ on the composite internal external gear member mounted upon the eccentric bearing, as before described, with the external gear P² meshing with the internal propeller gear P³ rigid with the propeller or driven member as shown.

In this instance, the means for holding the composite gear against rotation and for transmitting motion therefrom, as shown includes a wheel having a brake surface at 24 and a hub member 21. Offset crank members designated 30, each having bearings in a flange 31 rigid with the composite gear and in the web of the brake wheel 20 connect the composite gear to the wheel. The offset of these cranks corresponds to the amount of eccentricity of the eccentric bearing whereby they may revolve idly when the bearing is being rotated with relation to the brake member or may positively prevent relative rotation between the composite gear and the casing when the brake is applied.

The means for holding the eccentric bearing against rotation is illustrated in Fig. 2 as a brake wheel 35 having a brake surface 36 to which a brake band indicated at 38 may be applied, the wheel 36 having its bearing or hub keyed to the extended sleeve of the eccentric bearing 15.

Figure 5:
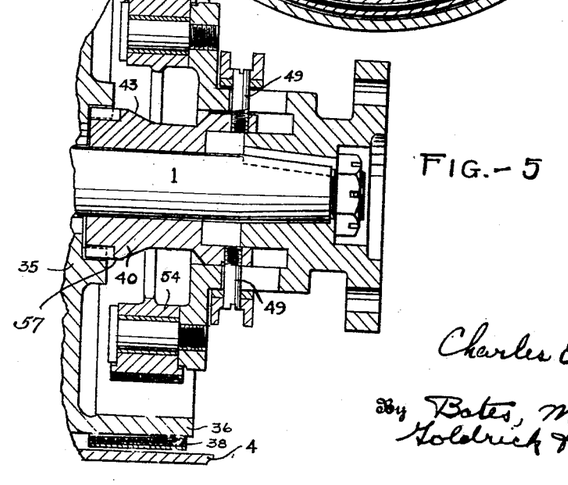
Fig. 5 is a detail section of the clutch arrangement as shown in the form of Fig. 2, the plane of the view being taken at right angles to the plane of Fig. 2.
Figure 6:
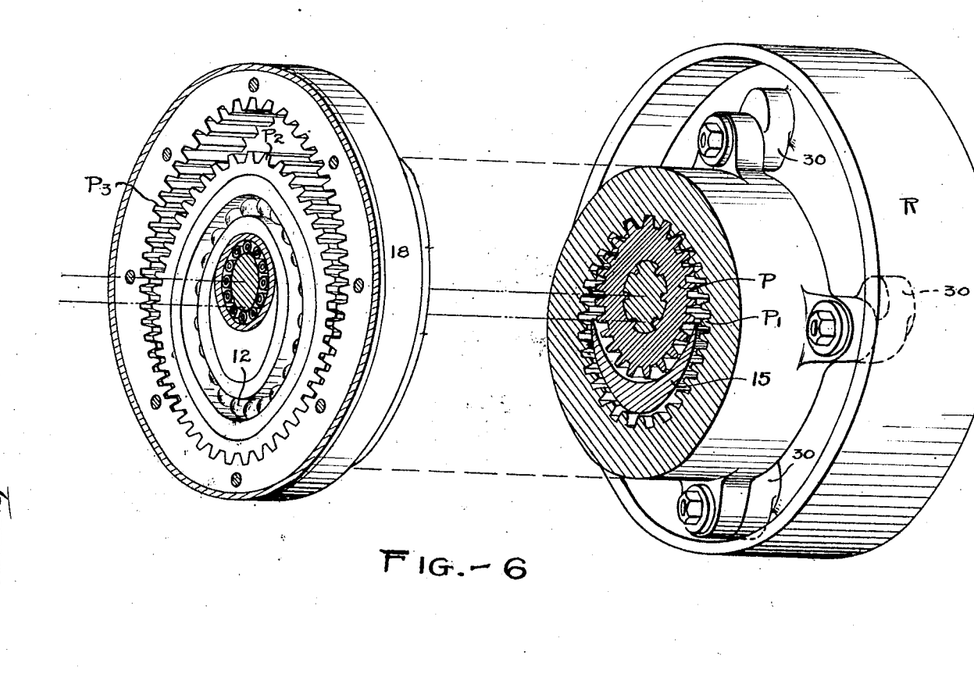
Fig. 6 is a perspective and somewhat diagrammatic view of the gearing parts for the purposes of more clearly showing the relative positions of the parts. This view shows the arrangement of Fig. 2.

For another condition, it is desired to directly connect the engine or driving member with the eccentric bearing. This may be a clutch member such as shown at the right in Fig. 2 comprising a sliding sleeve 40 having teeth 41 adapted to engage the corresponding teeth shown as formed in the hub of the brake wheel 35 and as having a splined engagement with the member 45 arranged for suitable connection to the engine. A shipper collar 48 connected by pins 49 with the member 40 (Fig. 5) may move the teeth 41 into or out of engagement. Before these teeth are brought into engagement, the means for bringing the teeth into approximate coincidence is caused to act. This means as shown consists of clutch arms 54 having contacting portions 52 which when the teeth are out of engagement rest on a cylindrical portion 57 of the member 40. As the teeth are brought toward each other the portions 52 may move inwardly along a conical surface 43 which permits springs 58 to force the arms 54 outwardly into engagement with the flange 36.

The driving condition resulting from connecting the eccentric bearing to the shaft as above described is that of direct drive, that is when both the members 1 and 2 rotate at the same speed. It will be apparent that with the eccentric bearing thus locked with relation to the driving member there is no relative rotation between any of the gears.

A lower speed of the propeller than that of the driven member and corresponding increase of power occurs when the eccentric 15 is held from rotation by the brake members 36 and 38. This results in P driving P¹ with the corresponding reduction of speed and P² driving the propeller 5, also with the corresponding reduction of speed.

The next condition is that of a reverse which is accomplished by holding the member 20 correspondingly, therefore preventing rotation of the composite gear while leaving the eccentric free to rotate. In this condition, the engine shaft is rotating the pinion P which drives P¹ but instead of it rotating on the axis of the eccentric bearing correspondingly revolving the cranks 30, the driving rotation being prevented by the brake member 20 and 24 it results in driving the eccentric, transmitting the differential of power in creeping backward movement of the gear P² on the propeller gear P³ rotating the propeller member P² slowly in the opposite direction. In the form of Fig. 1, this reverse action is substantially the same, the rotation of the member 20 being prevented while the eccentric and composite gear are caused to revolve, R¹ will maintain a continuous engagement with R resulting in a relative slow rotation of the composite gear and a corresponding reverse or creeping action between P² and the propeller gear P³.

An illustration of the results taken from practical embodiments of suitable sized gears for an automobile transmission may assist in understanding this action. For example, if the engine be rotating at 600 then for direct drive with the parts locked, as described, the same speed of 600 will be transmitted to the propeller or driven member. For the reduced speed in the same direction of rotation of the propeller shaft we will assume gearing of the following pitch diameter proportions—P an engine shaft pinion that is 1.4; the diameter of the circle of rotation of the axis of the eccentric 15 which will be hereinafter referred to as S is 1; P¹ is 2.4; P² is 3.5; propeller or P³ is 4.5; R is 7.8 and R¹ is 6.8.

The following resulting speed occurs for the reduced speed of the propeller shaft, in the form of Fig. 1. Thus when the engine runs as before at 600 and the eccentric S is held against rotation, the propeller shaft is rotated at 272.3. It is immaterial for practical purposes but the other parts will rotate at the different speeds in the proportions given. In this instance R is rotated idly with the composite gear. Incidentally this occurs at a speed of 305.2 with the engine speed given. The reverse, that is, with R held against rotation, P rotating at 600, will deliver to the propeller gear a reverse motion of 67.

Referring to the reduced speed in the arrangement shown in Fig. 2 which is substantially the same as the arrangement shown in Fig. 1 in its functional operation, there being only the differential between the first P and $P^1$ and a second between $P^2$ and $P^3$ (the propeller) the cranks 30 permitting one circulation or revolution of the composite gear ($P^1$ and $P^2$) with relation to R but no difference in rotative speed. Assuming now that rotation of R is prevented, the rotative speed of $P^1$, $P^2$ which in this case is the same as member R by reason of being attached to the cranks is zero. But by reason of $P^2$ being smaller than $P^3$ a speed less than the rotation of the eccentric is delivered to the propeller 2, and because $P^2$ creeps around within $P^3$, in a reverse direction due to the free rotation of the eccentric in taking the reaction of the force tending to rotate $P^1$ the direction of rotation of the propeller is reversed.

The second or reduced speed in the same direction transmitted to the propeller is accomplished by holding the eccentric S through the clutch member 36 and 38 in the arrangement of Fig. 2 in which case the composite gear drags with it the member 20 by means of the cranks, giving the following result. Assuming the engine or drive shaft is 600, pinion P is the same. $P^1$ and $P^2$ are 350, which is incidentally the same speed as the arrangement shown in Fig. 1 and the propeller is at a still further reduced speed, being exactly 272.3 as before. In this case, because of the crank arrangement, the crank member simply idles with the composite gear member that is to say it is drawn around with it, wherefor the member R may be said to be also 350, whereas in the case of Fig. 1 it is slightly less which may be mentioned only to assist in understanding the relative rotations. The idling speed of R (with the eccenrtic stationary) in the arrangement shown in Fig. 1 is reduced because $R^1$ is driving R as a small external to a larger internal gear.

Figure 3:
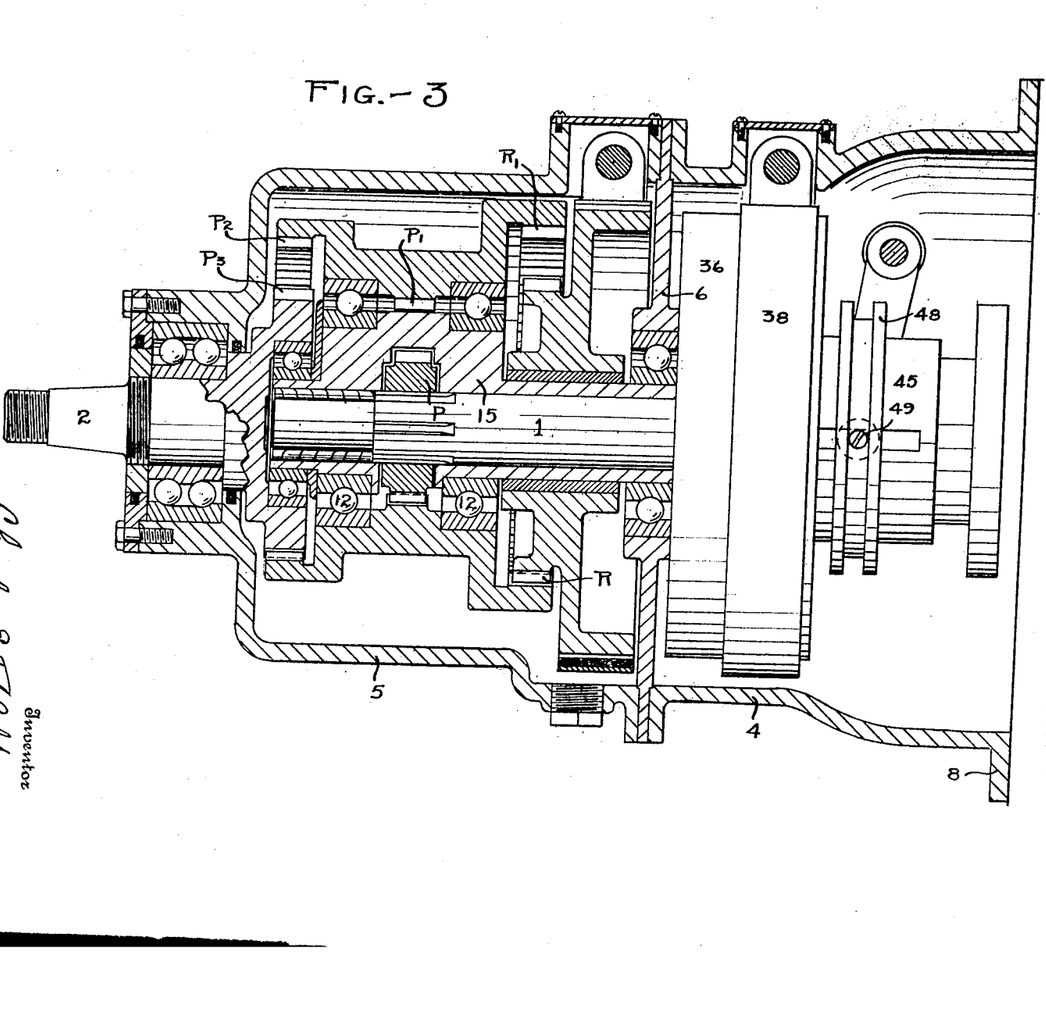
Fig. 3 is a similar section showing still another arrangement of the composite gear and meshing parts.
Figure 4:
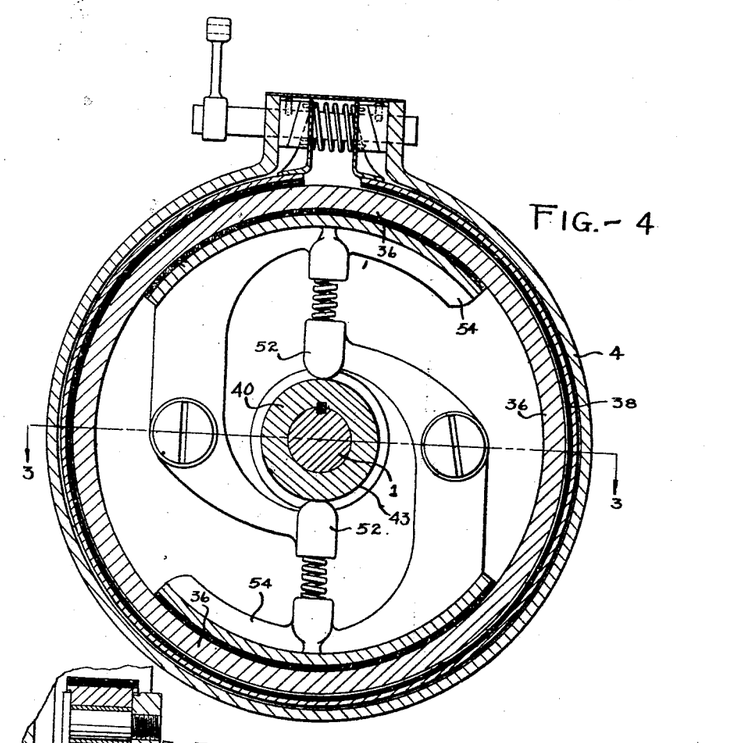
Fig. 4 is a transverse section taken substantially on the line 4—4 of Fig. 2.

In Fig. 3 is shown an arrangement in which P and $P^1$ and 15 are the same as in the former arrangements, R and $R^1$ are changed from internal to external respectively and $P^2$ and propeller $P^3$ are also reversed, the internal becoming the external. This is only illustrative of other arrangements in which either arrangement of R and $R^1$ and $P^2$ and $P^3$ as shown in Fig. 3 may be used with the arrangements shown in Figs. 1 and 2. The operation of the arrangement of Fig. 3 is identical with that of the arrangement of Fig. 1 but the speed ratios are materially altered. This may be a material advantage in obtaining another different speed with substantially the same degree of expense of construction. For a practical arrangement instead of the reverse, (which as in the former arrangement is in reality a reduction of the low speed of the propeller to a minus speed), I find that in such an arrangement as shown in Fig. 3 the "reverse" becomes positive drive, that is with the propeller rotating in the same direction as the engine shaft. With this arrangement of gearing only the direct and two other relative speeds between driving and driven members are possible. If the reverse becomes positive and very low forward, such an arrangement as this, as is shown in Fig. 3 may be very advantageous for a three forward speed transmission.

Assuming the same speed ratios and an engine speed of 600 as before, P of course, is the same and the driving relation between P and P' is the same as in the former arrangement. Now by holding R for the first reduction (corresponding to the second described arrangement as before) and leaving the eccentric which for convenience may be designated S free to rotate, the members of the composite gear, that is $R^1$, $P^1$ and $P^2$ are rotating at the same speed. Then since $P^2$ is larger than $P^3$ and because of the creeping action previously described, $P^3$, that is the propeller, is rotated at a lower speed but in the same direction, the speed being 147.1 although the revolving movement and the rotation of the composite gear $P^1$, $R^1$ and $P^2$ is in the opposite direction with the reaction member in this case becoming the teeth of R which is zero speed. The eccentric S is now running at a high speed with reverse motion to the engine shaft, the speed in this example being 1214. This condition corresponds to the reverse motion described in connection with Figs. 1 and 2.

Taking up the condition for this arrangement which corresponding to the second or reduced speed described in connection with the arrangements of Figs. 1 and 2, we now operate the clutch members 36 and 38 to hold the eccentric S stationary or at zero speed. Assuming an engine shaft speed of 600 as before, $P^1$ is 350 with $R^1$ and $P^2$ the same, being rigid therewith. R becomes idle and $P^2$ drives $P^3$ and the propeller at a higher speed than before, namely 450.2. R though idle is driven by $R^1$ at 401.5.

Another practical arrangement would be where R and R¹ are arranged as in Fig. 3 in the ratio of $$\frac{6.8}{7.8}$$

and with P² and P³ arranged as in Fig. 1 in the ratio of $$\frac{3.5}{4.5}.$$

The resulting low speed condition, with R stationary or zero is that the propeller shaft again goes in a negative or reverse direction in relation to the engine shaft, and assuming this is 600, the reverse speed of the propeller will be 390.5. The second speed or intermediate condition with the eccentric S stationary or zero (engine shaft and proportions the same) will give to the propeller 272.3 in a positive direction. This however is only a matter of gear ratios and is given for example. The gear ratio between R' and R might be easily varied to attain other speeds.

Figure 7:
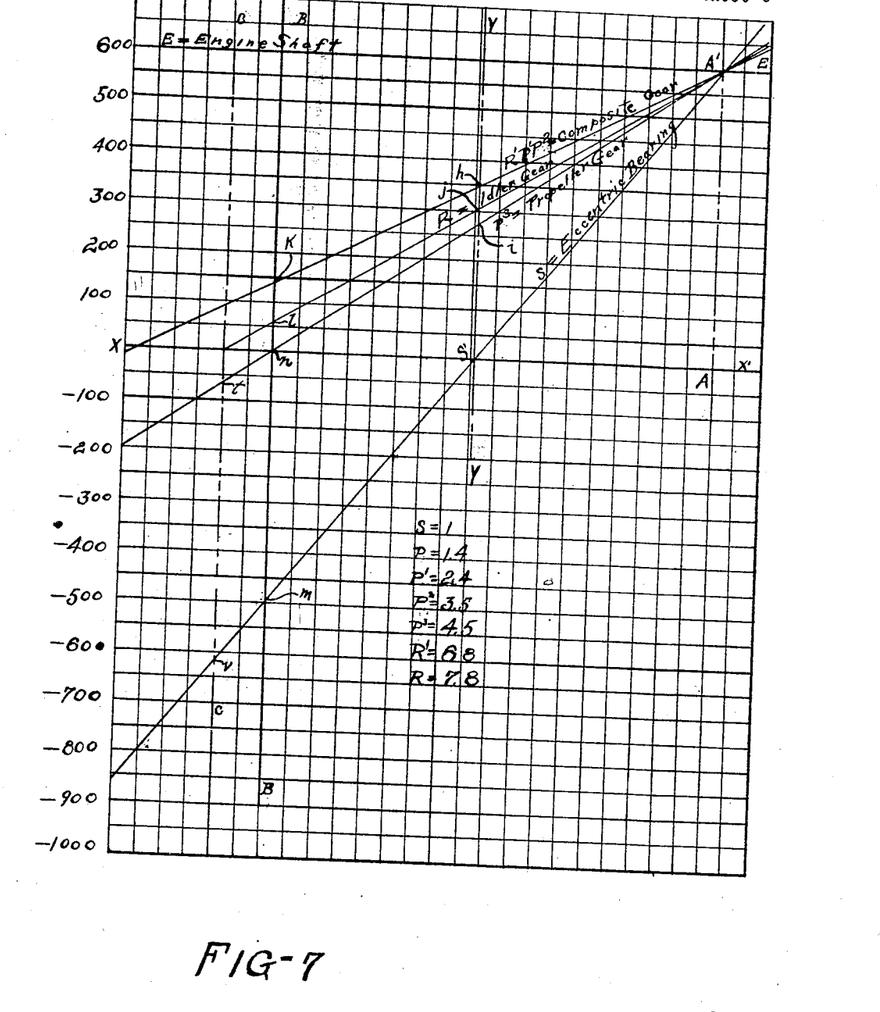
Figs. 7 to 9 are diagrams which illustrate the various speed relations of which the illustrated forms of my invention are capable.
Figure 8:
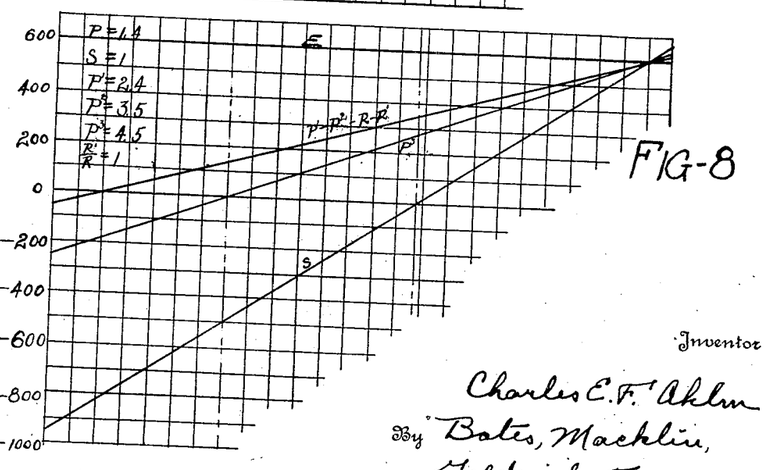
Figure 9:
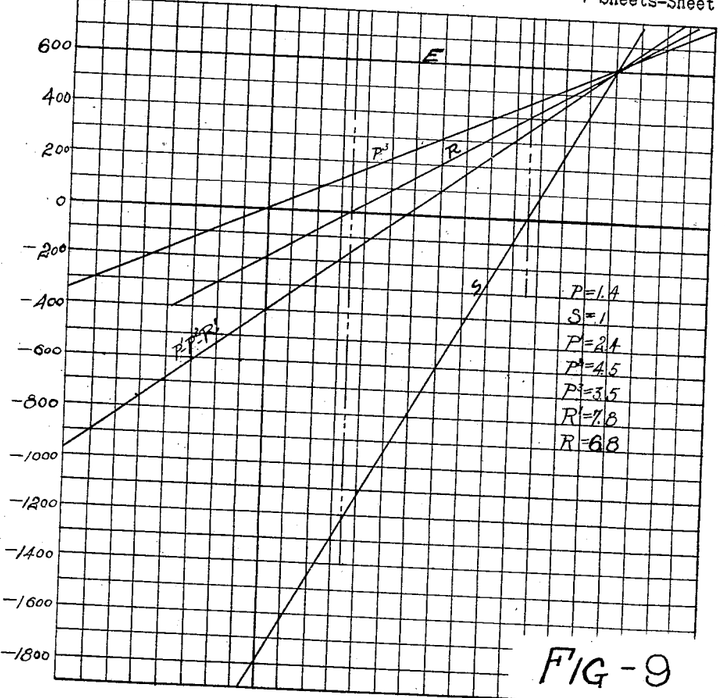

The applicant is aware of speed change gearing utilizing the composite gear, such as an internal external gear revoluble and rotatable upon an eccentric bearing but believes himself the first to make arrangements such as shown and claimed herein, and to further facilitate understanding the conditions of operation and results of such gearing it has been thought well to employ the diagrams of Figs. 7, 8 and 9, the lines of which illustrate the speed ratios above described in connection with the arrangements of Figs. 1, 2 and 3.

Referring to the diagram and first to Fig. 7, X—X is the abscissa corresponding to zero speed. YY is the ordinate corresponding to zero speed of one member only, in this case S is the eccentric. The numerals at the left of the ordinate line and above the zero abscissa XX indicate positive speeds above zero in which the driving and driven members, that is, the engine and propeller shafts and the other rotatable members are rotating in the same direction while the same numbers below XX are the minus speeds in which the propeller for instance has a reverse direction from that of the engine shaft.

Assuming an engine speed of 600, this may be indicated on the diagram by the horizontal line EE which represents a constant value, and assuming a point may be arbitrarily selected at A on the abscissa, the corresponding point A¹ on the line EE will represent a condition at which the speeds of all members are the same which is herein termed direct drive. The point S¹ at the intersection of the lines XX and YY represents the zero condition of the eccentric bearing. The theoretical decrease of speed of the eccentric from the point A' when S equaled E or the engine shaft speed, to the zero condition may be represented by the line S'A'. The speeds at which the other members are now rotating may be easily solved, since they are in simple geared connection with the engine shaft or pinion P. For example, the speed of P and P' are in inverse proportion to 1.4 and 2.4 (the ratio of the relative sizes of the gears). These relative sizes are listed on the diagram at S=1; P=1.4; P'=2.4 etc. The speed of P' is found to be 350 and is indicated on the ordinate line YY at $h$. Likewise the speeds of R and P³ are found to be 305.2 and 272.3 in the same direction as the engine shaft and are indicated at points $j$ and $i$ respectively on abscissæ parallel to and above the line XX.

For another speed condition, the propeller gear P³ may be considered as uniformly slowed down to zero (engine speed remaining at 600) and this uniform decrease of speed may be graphically represented by the projection of a straight line through A' and $i$ until it intersects the zero abscissa at $n$. This condition would obtain in case the brake members 24 and 36 of Fig. 1 were left free to rotate and the propeller shaft and rear axle held stationary as by the engagement of the automobile wheels with the ground. The speeds at which the other members are now rotating are: Composite gears P'P²R¹, 142.3; idler gear R, 60.2; and that of the eccentric S, −498.7. These values are represented on the ordinate, BB, which passes through the point $n$, at K, $l$ and $m$ respectively.

Since the decreasing speed of one of the members is represented by a straight line, it will be understood that the points, K, $l$ and $m$ will fall on straight lines drawn through the corresponding points $h$, $j$ and S' on the ordinate YY and the point A' by reason of the unchanging geared relationships of the rotating members of the gearing.

The speed of the propeller when the idler gear R is held at zero may be found by simply projecting the line P³ until it intersects the ordinate CC at $t$, a distance below the zero abscissa indicating a minus or reverse speed of 67. The eccentric now runs backward as indicated at $v$, at a speed of 621.3.

Taking up the diagrams Figs. 8 and 9 which as previously stated, correspond to Figs. 2 and 3, it will be noted that in case of Fig. 8, the ratio of R to R' is $l$, due to the cranks 30 which prevent relative rotation therebetween, and therefore the speeds of the composite gear and of R are indicated by one line P' P² RR'. In Fig. 9, the ratios of R/R' and P²/P³ are simply the reverse of Fig. 1 as diagrammatically illustrated in Fig. 7. The above charts will not be described in detail since their interpretation is substantially the same as Fig. 7 and they are only included to aid in understanding the earlier description of speed relations of the corresponding embodiments.

It will be seen that I have provided a gearing which may, with inconsiderable changes of details of construction involving but little cost, attain an infinite number of speed relations between the driving and driven members. Certain of the parts in such speed combinations as described in connection with Fig. 3 notably the eccentric, when the idler member R is prevented from rotating, is rotated at a very high reverse speed. It will be noted that I have provided very substantial bearings to support this eccentric member as well as a counterweight 60 to attain a nearly true dynamic balance and thus prevent undue stresses of the material forming the associated parts. I desire to vary this construction as required by new conditions which may arise in the manufacture of my gearing in attaining the various desirable speed relations of which my invention is capable. Modification of bearings where the speeds of some of the members become very high as well as providing different and more perfect counter weight arrangements for the eccentric parts I consider within the spirit of my invention, and I do not wish to otherwise limit myself to inessential details.

I claim:

1. In a transmission gearing, in combination, a casing, a pair of members to be connected in different speed relations and carried by the casing, a rotatable and revoluble gear member in offset relation thereto surrounding one of said members and having a geared connection with both, a releasable connection between the gear member and casing for retarding the rotating movement of the gear member but permitting the revolving movement thereof for imparting a low speed from one of the first mentioned members to the other and means for holding the gear member against revolution but permitting it to rotate freely for a different speed.

2. In a transmission gearing, a casing, a rotatable member therewithin, a pinion rigid with the member, a composite gear member extending along the rotatable member forwardly and rearwardly of the pinion and capable of being revolved about an axis concentric with the rotatable member and rotated on an eccentric axis, said gear member having one set of teeth in mesh with the pinion, a gear having teeth in mesh with another set of teeth of the gear member, and a releasable connection between the gear member and casing for retarding the rotating movement of the gear member while permitting its revolution for causing the gear to be driven at a low speed.

3. In a transmission gearing, in combination a driving member, a rotatable and revoluble internal-external gear member in offset axial relation thereto and having a geared connection therewith, a driven member having a geared connection with said gear member, independently controlled revoluble means for retarding the rotating movement of the gear member but permitting the revolving movement thereof for imparting a low speed to the driven member and for releasing the gear member and allowing it to rotate for transmitting a second reduced speed to the driven member and means for controlling the revolving movement of the gear member when the revoluble means is released.

4. In a transmission gearing a driving member, a pinion carried thereby, a composite gear member having a geared connection with said pinion capable of a revolving movement about an axis concentric with the driving member and of a rotating movement on an axis eccentric to the driving member, a driven member, means for controlling the revolving movement of the gear member in axial alignment with said driving member and having a gear rigid therewith adapted to engage said composite gear member and be driven thereby at a given speed when the composite gear simply rotates, and means constrained to simple rotation but having a positive connection with the composite gear member for retarding the rotating movement thereof, whereby the driven member may be driven at a different speed.

5. In a transmission gearing a pair of members to be connected in different speed relations, a pinion carried by one of said members, a composite gear having teeth meshing with said pinion, capable of a revolving movement about an axis concentric with one of said members, and of a rotating movement on an eccentric axis, an independently rotatable bearing member therefor, a gear rigid with the other of said first named members in mesh with other teeth of the composite gear and frictionally controlled independently rotatable means having a positive connection with the composite gear for restraining the rotating movement thereof.

6. In a gearing, in combination a pair of rotatable members to be connected in different speed relations, an eccentric bearing, a pinion carrying member, a composite gear member capable of a rotating and revolving movement, driven by the pinion and supported by the eccentric bearing, a brake member connected to said composite gear, said brake member being free to rotate with relation to the shaft and bearing, a gear on the other of said rotatable member in mesh with teeth of said composite gear and means for operating the brake to cause the rotatable members to be driven at a plurality of relative speeds depending upon the rotating or revolving movement of the composite gear.

7. In a gearing of the class described, a pair of members to be connected in different speed relations, an independently rotatable eccentric bearing member, a composite gear having two complete sets of gear teeth, said gear member being supported by the bearing and surrounding the same, a pinion rigid with one of said first named members in mesh with said composite gear, a braking means associated with the composite gear to restrain its rotation, means for restraining the rotation of said bearing member, a gear rigid with the other of said first named members in mesh with teeth of the composite gear, said restraining means being operable to arrest the movement of the bearing for causing the first named members to rotate at a given relative speed, and said braking means being operable when the restraining means is inoperative to effect a second speed relation between the first named members.

8. In a gearing of the class described a driving member, a driven member, an eccentric bearing journalled for rotation about said driving member, a composite gear having two sets of gear teeth and supported by the bearing, a pinion on said driving shaft meshing with one of said sets of teeth, a member associated with the composite gear for restraining its rotation, a braking member rigid with said bearing, a gear rigid with the driven member in mesh with teeth of the composite gear, means for operating the braking member for arresting the movement of the bearing and causing the driven member to rotate at a given speed and means for operating the restraining member for retarding the rotation of the composite gear while permitting a definite movement thereof with relation to the bearing to effect a change of speed.

9. In a gearing in combination a driving shaft, a pinion carried thereby, an eccentric bearing mounted to revolve about said shaft, a composite gear member driven by the pinion and supported by the eccentric bearing and capable of rotative and revolving movement, a brake member free to rotate with relation to the shaft and bearing, a driven member and a gear rigid therewith in mesh with teeth of the composite gear and arranged to be driven at different speeds thereby depending on the relative rotating and revolving movement of the composite gear, and a connection between said brake member and composite gear permitting relative movement between said brake member and composite gear for affecting the rotating movement thereof.

10. In a gearing of the class described, a driving member having a pinion, a rotatable eccentric bearing, a composite gear supported by the bearing having teeth in mesh with said pinion, a driven member in geared relation to said composite gear, a tubular member rigid with said bearing, a braking member journalled for rotation exteriorly of the tubular member, a clutch, one element of which is rigid with said tubular member for preventing relative movement between the driving member and the bearing whereby the driven member may be rotated at a given speed, means for operating the clutch, and a connection between the composite gear and said braking member for retarding the movement of the gear whereby the driven member is driven at another speed, and means for operating the brake.

11. In a gearing of the class described a driving member having a pinion, a rotatable eccentric bearing, a composite gear supported by the bearing in mesh with said pinion, a driven member in geared relation to said composite gear, a braking member journalled for free rotation about the bearing member, a friction couple, one element of which is rigid with said bearing member operable to prevent relative movement between the driving member and bearing, whereby the driven member may be rotated at a given speed, means for operating the couple, a constant connection between the composite gear and said braking member for restraining the movement of the gear whereby the driven member is driven at another speed, and means for operating the braking member.

12. In a gearing of the class described in combination a driving member, a pinion rigid therewith, an eccentric bearing exteriorly of the driving member freely rotatable relative thereto, a hollow composite gear member surrounding and carried by the bearing in mesh with the pinion, a driven member having a gear in mesh with the composite gear member, a member having a braking surface rigid with the bearing, means cooperating therewith to prevent the rotation of the bearing for a reduced speed and a manually operable clutch between the driving member and said bearing for effecting a connection therebetween for direct drive.

13. In a gearing of the class described, in combination a pair of rotatable members to be connected in different speed relations, a pinion rigid with one of said members, an eccentric bearing freely rotatable relative to both a hollow composite gear member surrounding and carried by the bearing in mesh with the pinion, a gear rigid with the other of said members in mesh with the composite gear, a brake for preventing the rotation of the bearing for a reduced speed and a manually operable clutch between one of said first named members and said bearing for effecting a positive connection therebetween for direct drive.

14. In a gearing of the class described, in combination, a rotatable member having a pinion, an eccentric bearing freely rotatable relative thereto, a composite gear carried by the bearing in mesh with the pinion, another rotatable member having a gear in mesh with said composite gear, a braking member having a constant connection with the composite gear for restricting the rotation thereof for a given speed, dental clutch members rigid with one of the rotatable members and the bearing for preventing relative rotation therebetween for direct drive, and friction means for partially synchronizing the relative speeds of the members to be connected by the clutch before operating the clutch.

15. In a gearing of the class described, in combination, a pair of rotatable members to be connected, one of said members having a pinion, an eccentric bearing freely rotatable relative thereto, a composite gear member carried by the bearing in mesh with the pinion, a gear on the other of said rotatable members in mesh with teeth of the composite gear member, means for preventing the free rotation of the bearing member for a reduced speed, clutch members rigid with one of the said rotatable members and the bearing for preventing relative rotation there-between for direct drive, and means for partially synchronizing their relative speeds before operating the clutch.

16. In a gearing of the class described, in combination a rotatable member having a pinion, an eccentric bearing capable of free rotation relative thereto, a composite gear carried by the bearing in mesh with the pinion, another rotatable member having a gear in mesh with said composite gear, means for restricting the rotation of the composite gear for a given speed, means for restricting the rotation of the eccentric bearing for another speed, cooperating clutch members rigid with one of the rotatable members and the bearing resspectively for preventing relative rotation therebetween for establishing direct drive between the said rotatable members, and means for partially synchronizing the relative speeds of the members to be clutched before operating the clutch.

17. In a gearing of the class described, a driving member, a pinion rigid therewith, an internal-external gear mounted eccentrically of the driving member in mesh with said pinion, a driven member having a geared connection with said internal-external gear, a braking member freely journalled exteriorly of said driving member, a positive connection between said braking member and said internal-external gear for retarding the movement thereof when the braking member is operative, yet permitting the internal-external gear to drive the driven member at a definite slow speed, a rotatable eccentric bearing for said internal-external gear, means including a brake for holding the bearing against rotation relative to the gear casing, and means for preventing relative rotation between the bearing and driving member.

18. In a gearing of the class described, a pair of rotatable members, a pinion rigid with one of the members, a composite gear member meshing with the pinion, a gear rigid with the other rotatable member meshing with the composite gear, an eccentric bearing mounted for rotation about one of said rotatable members, anti-friction bearing members carried thereby for supporting the composite gear member and disposed at either side of said pinion, a sleeve rigid with the bearing, means associated therewith for coupling the bearing to one of said rotatable members for direct drive, rotatable and restrainable means having a constant connection with said composite gear member for retarding the movement thereof when the bearing is free to rotate independently of either rotatable member whereby the composite gear member is rotated at low speed.

19. In a gearing of the class described, a driving member, a pinion rigid therewith, a composite gear member meshing with the pinion, a driven member in geared relation to said composite gear member, an eccentric bearing member exteriorly of said driving member capable of free rotation, anti-friction bearing members carried thereby for supporting the composite gear member and disposed at either side of said pinion, a sleeve rigid with and extending along the driving member, means associated therewith for coupling the bearing member to the driven member for direct drive, restrainable means freely journalled on said sleeve and connected to said composite gear member for retarding the movement thereof when the bearing member is free to rotate, whereby a low speed is imparted to the driven member.

20. In a transmission gearing in combination a driving member, a rotatable and revoluble internal-external gear member in offset axial relation thereto and having a geared connection therewith, a driven member having a geared connection with said gear member, means including a braking member and gears connecting the gear member to the braking member for retarding the rotating movement of the gear member for imparting a low speed to the driven member, and means including an eccentric bearing for the internal-external gear adapted to be separately controlled to cause the driven member to be rotated at a higher speed.

21. In a transmission gearing in combination, a pair of rotatable members to be connected, a rotatable and revoluble composite gear member in offset relation thereto and having a geared connection with both of said members, an independently rotatable bearing therefor, means including a restrainable member and a gear rigid therewith in mesh with a gear of said composite gear member for retarding the rotating movement of said gear member but permitting the revolving movement thereof for a given speed and means for controlling the rotation of the bearing whereby the composite gear member is permitted to rotate for causing the first named members to be rotated at a different relative speed.

22. In a transmission gearing a driving member, a pinion carried thereby, a composite gear member in mesh with said pinion, and capable of a revolving movement about an axis concentric with the driving member, a rotatable eccentric bearing member having rolling bearings for the composite gear disposed at either side of said pinion, a driven member in axial alignment with said driving member and having a gear rigid therewith in mesh with said composite gear member, means for controlling the rotation of said eccentric bearing whereby the driven member may be rotated at a reduced speed and means for retarding the rotating movement of said composite gear member whereby when the controlling means is inoperative the driven member may be driven at a still further reduced speed.

23. In a transmission gearing a pair of rotatable members, a pinion carried by one of said members, a rotatable composite gear member in mesh with said pinion, capable of a revolving movement about an axis concentric with one of the said rotatable members, a rotatable eccentric bearing member extending through the gear member and having rolling bearings for the composite gear disposed at either side of said pinion, means for controlling the rotation of said bearing, a geared connection between the composite gear and the other of said rotatable members, whereby when the rotation of said eccentric bearing is controlled a given relative rotation between the said rotatable members obtains and means for restraining the movement of said composite gear member, whereby when the eccentric is free to rotate a different relative rotation obtains.

24. In a gearing, in combination, a driving shaft, a pinion carried thereby, a rotatable eccentric bearing exteriorly of said shaft, a composite gear member capable of a rotating and revolving movement driven by the pinion and supported by the eccentric bearing, a driven member geared to said composite gear, a brake drivingly connected to said composite gear member for controlling the rotating movement of the composite gear, means for operating the brake to secure a given speed relation between the driving and driven members, and a second brake member rigid with said eccentric bearing and having a counterweight for balancing the eccentric, said latter brake being operative to hold said eccentric against rotation for another speed.

25. In a gearing in combination a pair of rotatable members, a pinion carried by one of such members, a rotatable eccentric bearing, a composite gear member capable of a rotating and revolving movement, driven by the pinion and supported by the eccentric bearing, said composite gear being also in geared relation to the other of said rotatable members, means for controlling the rotating movement of the composite gear, a member rigid with said eccentric bearing having a counterweight for balancing the eccentric and releasable means carried by the casing and acting on said member for holding the eccentric bearing against rotation.

26. In a gearing of the class described, in combination, a rotatable member, a pinion rigid therewith, an eccentric bearing capable of free rotation relative thereto, a rotatable and revoluble composite gear member carried by the bearing in mesh with the pinion, another rotatable member having a gear in mesh with the composite gear member, means for restraining the rotation of the composite gear while permitting it to revolve for a given speed, a dental couple for controlling the free rotation of the eccentric bearing for another speed, and friction means actuated by the relative movement toward each other of the dental couple and previous to their engagement for controlling the rotation of the eccentric.

27. In a gearing of the class described, in combination, a pair of rotatable members, a pinion rigid with one of the members, an eccentric bearing capable of independent rotation, a composite gear member carried by the bearing in mesh with the pinion, and having a geared connection with the other of said rotatable members, means for counterbalancing the eccentric, means for preventing the rotation of the bearing for a reduced speed, a manually operable positive clutch between one of the said rotatable members and said bearing for effecting a positive connection therebetween for equalizing the speeds of the rotatable members and means becoming operative when the members of said positive clutch are brought toward each other for causing partial synchronization of said driving member and bearing previous to operating the positive clutch.

28. In a gearing of the class described in combination a rotatable member, a pinion rigid therewith, an eccentric bearing exteriorly of the rotatable member, freely rotatable relative thereto, a composite gear member carried by the bearing in mesh with the pinion, another rotatable member having a gear rigid therewith in mesh with the composite gear member, a member having a braking surface rigid with the bearing, means cooperating therewith to prevent the rotation of the bearing for a given speed, a manually operable positive clutch between one of said rotatable members and said bearing for effecting a positive connection therebetween, and means becoming operative when the members of said positive clutch are brought toward each other for causing partial synchronization of the members to be connected previous to operating the positive clutch.

29. In a gearing in combination a rotatable member, a pinion carried thereby, an eccentric bearing mounted to rotate about said member, a composite gear member driven by the pinion and supported by the eccentric bearing, a control member and means cooperating therewith to restrain the rotation of the composite gear while permitting it to revolve about the axis of the shaft and means for preventing relative rotation between the bearing member and rotatable member comprising a friction member rigid with one of said last mentioned members, a plurality of pivoted friction members carried by the other and slidably mounted means engaging the pivoted members.

In testimony whereof, I hereunto affix my signature.

CHARLES E. F. AHLM.